United States Patent
Clark (10) Patent No.: US 11,112,269 B2
(45) Date of Patent: Sep. 7, 2021

(54) METHODS AND SYSTEMS FOR SELF-TESTING MEMS INERTIAL SENSORS

(71) Applicant: Analog Devices, Inc., Norwood, MA (US)

(72) Inventor: William A. Clark, Winchester, MA (US)

(73) Assignee: Analog Devices, Inc., Wilmington, MA (US)

(*) Notice: Subject to any disclaimer, the term of this patent is extended or adjusted under 35 U.S.C. 154(b) by 560 days.

(21) Appl. No.: 16/029,841

(22) Filed: Jul. 9, 2018

(65) Prior Publication Data

US 2020/0011702 A1    Jan. 9, 2020

(51) Int. Cl.
*G01C 25/00* (2006.01)
*G01P 21/00* (2006.01)
(Continued)

(52) U.S. Cl.
CPC .............. *G01C 25/00* (2013.01); *G01P 21/00* (2013.01); *G01C 19/5656* (2013.01)

(58) Field of Classification Search
CPC .... G01C 25/00; G01C 19/5656; G01C 19/56; G01P 21/00; G01P 2015/0831; G01P 15/125
See application file for complete search history.

(56) References Cited

U.S. PATENT DOCUMENTS 6,792,792 B2    9/2004    Babala
7,127,932 B2    10/2006   Morell et al.
(Continued)

FOREIGN PATENT DOCUMENTS

CN    103983257 A    8/2014
JP    2008501981 A   1/2008
(Continued)

OTHER PUBLICATIONS

Ip.com NPL search based on search query—Jan. 2021.*
(Continued)

*Primary Examiner* — Peter J Macchiarolo
*Assistant Examiner* — Anthony W Megna Fuentes
(74) *Attorney, Agent, or Firm* — Wolf, Greenfield & Sacks, P.C.

(57) ABSTRACT

Techniques for self-testing of microelectromechanical systems (MEMS) inertial sensors are described. Some techniques involve testing inertial sensor characteristics such as an accelerometer's sensitivity to acceleration and a gyroscope's sensitivity to angular motion. The tests may be performed by providing a test signal, which simulates a stimulus such as an acceleration or angular rate, to a MEMS inertial sensor and examining the sensor's output. The efficacy of such self-tests may be impaired by spurious signals, which may be present in the sensor's environment and may influence the sensor's output. Accordingly, the self-testing techniques described herein involve detecting the presence of any such spurious signals and discarding self-test results when their presence is detected. In some embodiments, the presence of spurious signals may be detected using a signal obtained by mixing the response of the MEMS inertial sensor with a reference signal substantially in quadrature with the test signal.

20 Claims, 6 Drawing Sheets

(51) Int. Cl.
*G01C 19/5656* (2012.01)
*G01P 15/08* (2006.01)
*G01P 15/125* (2006.01)

(56) References Cited

U.S. PATENT DOCUMENTS

| | | | |
|---|---|---|---|
| 8,151,641 | B2 | 4/2012 | Geen |
| 8,783,103 | B2 | 7/2014 | Clark et al. |
| 9,109,901 | B2 | 8/2015 | Fang et al. |
| 9,238,580 | B2 | 1/2016 | Alagarsamy et al. |
| 9,625,272 | B2 | 4/2017 | Tao et al. |
| 9,817,023 | B2 | 11/2017 | Miller et al. |
| 9,846,037 | B2 | 12/2017 | Aaltonen |
| 9,869,552 | B2 | 1/2018 | Gregory |
| 10,030,975 | B2 | 7/2018 | Balslink |
| 2005/0268716 | A1 | 12/2005 | Hrovat et al. |
| 2006/0150709 | A1 | 7/2006 | Deb et al. |
| 2009/0241634 | A1 | 10/2009 | Acar |
| 2010/0145660 | A1 | 6/2010 | Lang et al. |
| 2011/0146402 | A1 | 6/2011 | Donadel et al. |
| 2015/0057959 | A1 | 2/2015 | Ezekwe |
| 2015/0285658 | A1 | 10/2015 | Zotov et al. |
| 2016/0202286 | A1 | 7/2016 | Aaltonen et al. |
| 2017/0199035 | A1 | 7/2017 | Seeger |

FOREIGN PATENT DOCUMENTS

| | | |
|---|---|---|
| JP | 2012528306 A | 11/2012 |
| JP | 2014016350 A | 1/2014 |
| JP | 2014174167 A | 9/2014 |
| JP | 2014174175 A | 9/2014 |
| JP | 2016529520 A | 9/2016 |

OTHER PUBLICATIONS

Ip.com Patent search based on PGPUB—Jan. 2021.*
Ip.com Patent search based on search query—Jan. 2021.*
IP.com Search query—Jan. 2021.*
[No Author Listed], Low Noise, Wide Bandwidth, MEMS Accelerometer. ADXL1005. Analog Devices. Apr. 2018. 14 pages.
Balachandran et al., A 3-Axis Gyroscope for Electronic Stability Control With Continous Self-Test. IEEE Journal of Solid-State Circuits. 2015; 1-10.
Kundur, An Electrical Stimulus based Built in Self Test (BIST) circuit for Capacitive MEMS accelerometer. Thesis Presented in Partial Fulfillment of the Requirements for the Degree of Master of Science. Arizona State University. Aug. 2013; 82 pages.
Tater et al., Quadrature-Error Compensation and Corresponding Effects on the Performance of Fully Decoupled MEMS Gyroscopes. Published Jun. 2012 in Journal of Microelectromechanical Systems. Sematic Scholar. Retrieved from the Internet: https://www.semanticscholar.org/paper/Quadrature-Error-Compensation-and-Corresponding-on-Tatar-Alper/b24f33b12f3c9f6704eb2845b5f81ad060094ffl.
Wu, System architecture for mode-matching a MEMS gyroscope. DSpace@MIT. M. Eng. Thesis, Massachusetts Institute of Technology, Dept. of Electrical Engineering and Computer Science. 2009; 127-128. Retrieved from the Internet: https://dspace.mit.edu/handle/1721.1/53156.
Deb et al., Built-In Self Test of MEMS Accelerometers. Carnegie Mellon University, Pittsburgh, PA. Mar. 2006; 21 pages.

* cited by examiner

|  | In-phase response signal's amplitude > threshold 2 | In-phase response signal's amplitude < threshold 2 |
|---|---|---|
| Quadrature response signal's amplitude > threshold 1 | The result of the self-test is to be ignored | The result of the self-test is to be ignored |
| Quadrature response signal's amplitude < threshold 1 | The MEMS inertial sensor is functioning properly | The MEMS inertial sensor is malfunctioning |

FIG. 5

METHODS AND SYSTEMS FOR SELF-TESTING MEMS INERTIAL SENSORS

FIELD OF THE DISCLOSURE

The technology described in the present application relates to microelectromechanical system (MEMS) inertial sensors.

BACKGROUND

Inertial sensors are electronic devices that measure and report motion, forces, angular rates, and/or other quantities using one or more accelerometers and/or gyroscopes. A MEMS gyroscope may be configured to detect angular motion by sensing accelerations produced by Coriolis forces, which arise when they gyroscope's resonant mass undergoes angular motion. A MEMS accelerometer may be configured to sense linear and/or angular acceleration.

SUMMARY OF THE DISCLOSURE

One aspect of the present disclosure relates to techniques for self-testing of microelectromechanical systems (MEMS) inertial sensors. Some such techniques involve testing inertial sensor characteristics such as an accelerometer's sensitivity to acceleration and a gyroscope's sensitivity to angular motion. The tests may be performed by providing a test signal, which simulates a stimulus such as an acceleration or angular rate, to a MEMS inertial sensor and examining the sensor's output. The efficacy of such self-tests may be impaired by spurious signals, which may be present in the sensor's environment and may influence the sensor's output. Accordingly, the self-testing techniques described herein involve detecting the presence of any such spurious signals and discarding self-test results when their presence is detected. In some embodiments, the presence of spurious signals may be detected using a signal obtained by mixing the response of the MEMS inertial sensor with a reference signal substantially in quadrature with the test signal.

Another aspect of the present disclosure relates to a system for testing a microelectromechanical system (MEMS) inertial sensor. The system may comprise a signal generator configured to stimulate, using a test signal, the MEMS inertial sensor; test circuitry configured to: generate an in-phase response signal by mixing an in-phase reference signal with a response signal obtained from the MEMS inertial sensor in response to the test signal; generate a quadrature response signal by mixing the response signal with a quadrature reference signal; determine, based on the quadrature response signal, whether the in-phase response signal is to be used for assessing a characteristic of the MEMS inertial sensor; and when it is determined that the in-phase response signal is to be used for assessing the characteristic of the MEMS inertial sensor, assess the characteristic of the MEMS inertial sensor using the in-phase response signal.

Another aspect of the present disclosure relates to a method for testing a microelectromechanical system (MEMS) inertial sensor. The method may comprise stimulating, using a test signal, the MEMS inertial sensor; receiving a response signal from the MEMS inertial sensor in response to the stimulating; generating an in-phase response signal using the response signal and an in-phase reference signal; generating a quadrature response signal using the response signal and a quadrature reference signal; determining, based on the quadrature response signal, whether the in-phase response signal is to be used for assessing a characteristic of the MEMS inertial sensor; and when it is determined that the in-phase response signal is to be used for assessing the characteristic of the MEMS inertial sensor, assessing the characteristic of the MEMS inertial sensor using the in-phase response signal.

Another aspect of the present disclosure relates to a system for testing a microelectromechanical system (MEMS) inertial sensor. The system may comprise the MEMS inertial sensor; and test circuitry configured to: stimulate, using a test signal, the MEMS inertial sensor; receive a response signal from the MEMS inertial signal in response to the stimulating; generate an in-phase response signal using the response signal and an in-phase reference signal, and generating a quadrature response signal using the response signal and a quadrature reference signal; determining, based on the quadrature response signal, whether the in-phase response signal is to be used for assessing a characteristic of the MEMS inertial sensor; and when it is determined that the in-phase response signal is to be used for assessing the characteristic of the MEMS inertial sensor, assess the characteristic of the MEMS inertial sensor using the in-phase response signal.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Self-testing is a technique used in electronics to assess whether electronic equipment operates according to its specification, or whether its operation is deviating from what is expected, which may indicate a problem with the equipment which may need to be addressed by fixing or replacing the equipment. An important benefit of self-testing is that it can be performed after the electronic equipment has been installed and/or deployed, after manufacture and out of the manufacturer's control, and possibly, without even having to disrupt its normal operations.

MEMS inertial sensors are one example of electronic equipment that may be self-tested after it has been installed and/or deployed. MEMS inertial sensors, such as accelerometers and gyroscopes, are devices fabricated using micromachining techniques. The mechanical nature of these devices renders them sensitive to external environmental conditions, such as large temperature fluctuations, changes in pressure, and/or large mechanical vibrations, which may result in deteriorating performance, necessitate periodic maintenance, including partial or complete replacement. Self-testing is an effective technique for determining whether and when maintenance or replacement of MEMS parts should be performed.

The inventor has recognized that conventional techniques for self-testing MEMS inertial sensors may be improved upon because they are vulnerable by the presence of environmental noise and/or other spurious signals. In particular, the inventor has recognized that circuitry conventionally used for self-testing MEMS inertial sensors have limited ability to discern poor performance of the MEMS inertial sensor, (which may indicate that repairs or replacement are needed) from the presence of noise in the system, in which case no repairs are needed. As a result, conventional self-testing techniques lead to false alarms, whereby MEMS inertial sensors may be flagged as performing unsatisfactorily even though, in reality, there is no problem. For example, testing of MEMS accelerometers mounted in cars may produce false alarms when the driver honks the horn in the middle of a test. When the driver hits the horn, an acoustic vibration is produced which may inadvertently be interpreted by the MEMS accelerometer as an acceleration to be measured. As a result, the output of a MEMS accelerometer in the car may reflect the horn vibration and, when this occurs during a self-test cycle, the output of the MEMS accelerometer may be incorrectly interpreted as indicating an issue with the MEMS device because of the deviation from expected behavior.

Some embodiments of the technology described herein are directed to techniques and systems for self-testing MEMS inertial sensors that reduce or eliminate the above-described problems with conventional self-testing techniques. Specifically, some embodiments are directed to techniques for determining whether the results of a test are distorted by the presence of noise or other spurious signals. When it is determined that significant spurious signals are present that may distort the result of a test, the result of the test may be discarded.

In some embodiments, the presence of spurious signals that may significantly affect the accuracy of a test may be detected by determining if, upon being excited with a test signal, a MEMS inertial sensor responds with a non-negligible signal that is in quadrature with (or uncorrelated with) the expected test signal response. In quiet conditions, e.g., in an ideal scenario in which no spurious signals are present, the MEMS inertial sensor should not produce response signals in quadrature with the expected test signal response. Thus when the output of a MEMS inertial sensor is demodulated to detect said quadrature or uncorrelated signals the results may yield a response substantially equal to zero, as will be described in detail further below. Therefore, the presence of a non-negligible quadrature response signal may be interpreted as an indication that significant spurious signals are present. In this case, the test circuit may notify the user that the result of the test should be discarded, or may simply wait until the quadrature response signal has disappeared or fallen below a predefined threshold. Test signals of the types described herein may be configured so that the MEMS inertial sensor under test perceives them as mechanical stimuli, e.g., as acceleration and/or angular motion.

If it is determined that no significant spurious signals are present, the result of test may be considered accurate. For example, if the result of a test indicates that the sensitivity of an accelerometer to acceleration is unsatisfactory, a user may be relatively certain that the accelerometer's sensitivity is indeed unsatisfactory. In some embodiments, determining whether a characteristic of a MEMS inertial sensor is satisfactory, and therefore that the MEMS inertial sensor is functioning properly with respect to that characteristic, may comprise determining whether, upon being excited with a test signal, the MEMS inertial sensor responds with a signal in phase with the test signal that is sufficiently close to an expected value. Examples of characteristics that may be assessed using the techniques described herein include but are not limited to the sensitivity of a MEMS inertial sensor to acceleration or angular motion.

Figure 1:
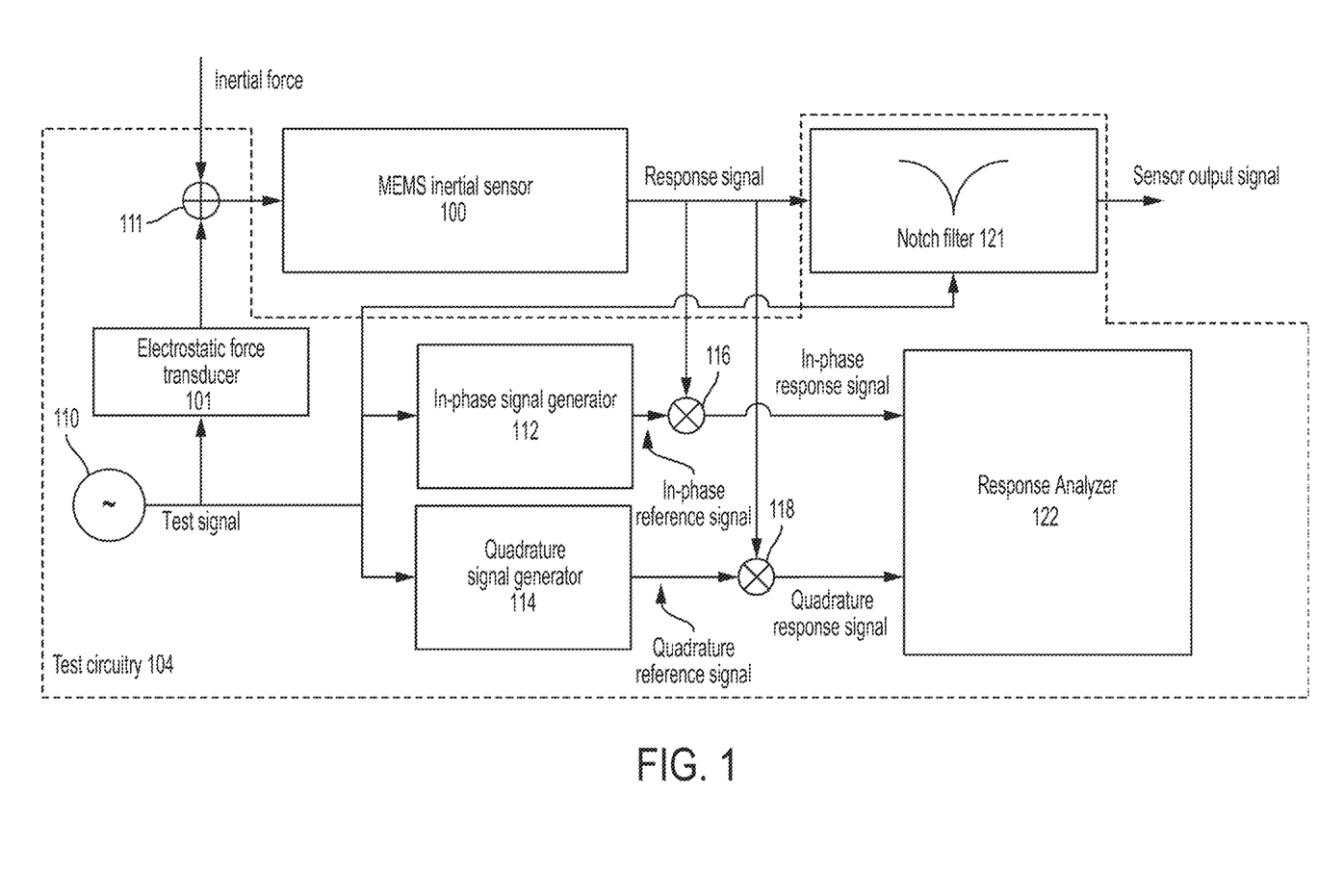
FIG. 1 is a block diagram illustrating an example system for testing a MEMS inertial sensor, in accordance with some embodiments of the technology described herein.

FIG. 1 is a block diagram of an example system for self-testing a MEMS inertial sensor, in accordance with some embodiments of the technology described herein. The system of FIG. 1 includes MEMS inertial sensor 100, notch filter 121, and test circuitry 104. Test circuitry 104 may be configured to self-test MEMS inertial sensor 100 so that the MEMS inertial sensor may be tested without human intervention or simply without a request from a user. Being a self-test system, in some embodiments, MEMS inertial sensor 100 may be deployed together with the test circuitry 104, such that the overall system may test the operational performance of the MEMS inertial sensor. In some embodiments, test circuitry 104 may be configured to automatically perform tests at one or more predefined times without input from a user. For example, in some embodiments the test circuitry 104 may be configured to test the MEMS inertial sensor 100 in a periodic fashion and/or according to a schedule. In other embodiments, test circuitry 104 may be configured to test the MEMS inertial sensor 100 in response to a user request. In some embodiments, test circuitry 104 may be configured to test the MEMS inertial sensor 100 without interrupting its normal operation (e.g., while a MEMS gyroscope is detecting angular motion or when a MEMS accelerometer is detecting acceleration). Additionally or alternatively, test circuitry 104 may be configured to test the MEMS inertial sensor 100 during one or more time periods in which the normal operations of the MEMS inertial sensor are discontinued.

In some embodiments, MEMS inertial sensor 100 may include any suitable type of micromachined sensor, including, but not limited to, one or more accelerometers and/or one or more gyroscopes. In some of the embodiments where the MEMS inertial sensor 100 includes one or more accelerometers, the accelerometer(s) may be designed to detect linear acceleration in one, two or three directions and/or angular acceleration about one, two or three axes. An accelerometer may include one or more proof masses configured to move (e.g., translate, pivot, and/or rotate) in response to acceleration and sensors (e.g., capacitive sensors) for sensing the motion of the proof mass(es).

Figure 2A:
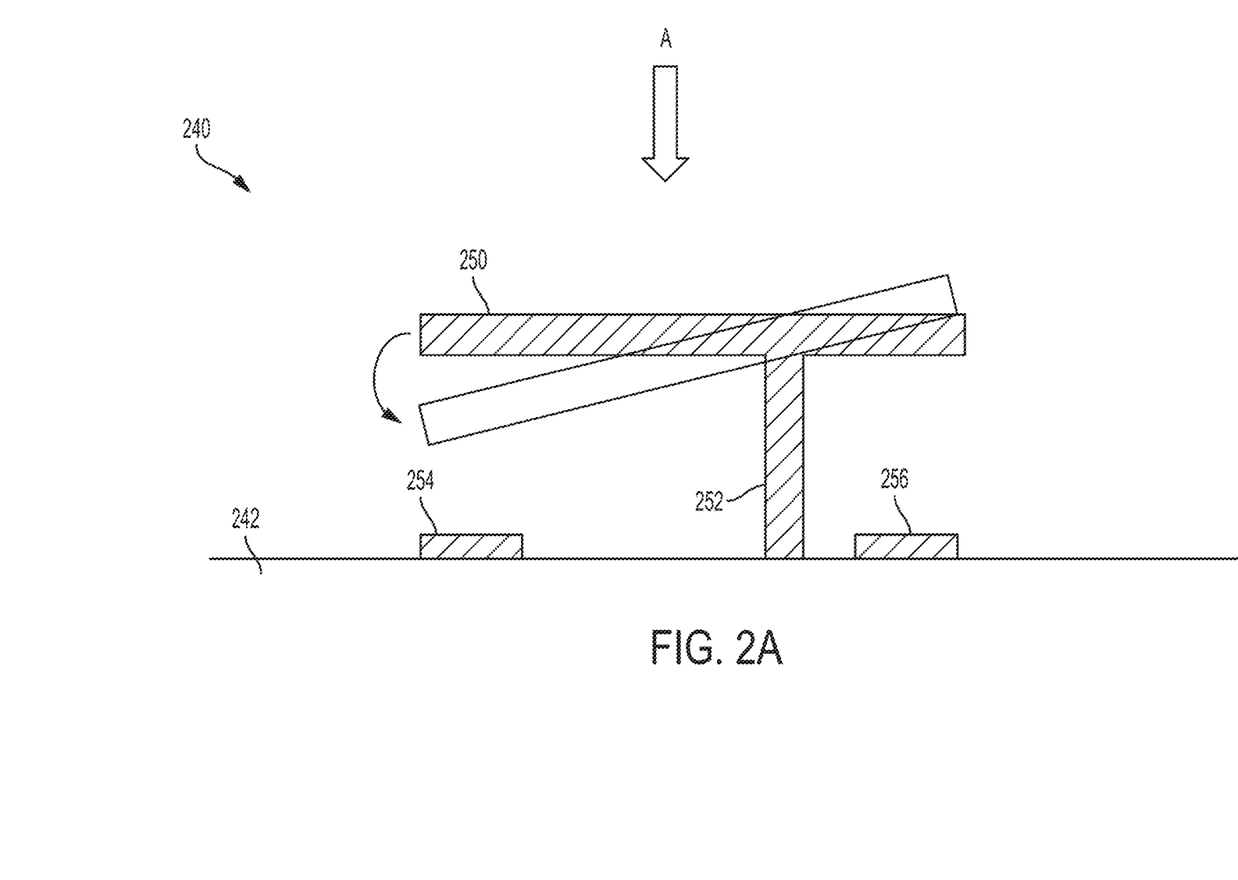
FIG. 2A is a schematic diagram of an illustrative MEMS accelerometer that may be tested using the example system of FIG. 1, in accordance with some embodiments of the technology described herein.

An example of an accelerometer that may be included in MEMS inertial sensor 100 is illustrated in FIG. 2A, in accordance with some embodiments of the technology described herein. The illustrative accelerometer 240 is configured to sense out-of-plane linear acceleration, though not all embodiments are limited in this respect. The accelerometer 240 includes a proof mass 250 connected to an underlying substrate 242 via anchor 252. The accelerometer further includes an electrode 254, which is formed on the top surface of the underlying substrate. Together with proof mass 250 (which may be made at least partially from a conductive material), electrode 254 forms a capacitive sensor. When the accelerometer is subject to an acceleration (labeled "A") in a direction toward the top surface of the substrate 242, proof mass 250 in response pivots about the anchor. As a result, the distance between the proof mass 250 and electrode 254 varies, changing the capacitance of the capacitive sensor. The magnitude of acceleration A may be determined based on the change in capacitance.

In some of the embodiments in which one or more gyroscopes is included in MEMS inertial sensor 100, the gyroscope(s) may be configured to detect angular velocities about one, two, or three axes. In these embodiments, a drive circuitry may be used to control the operations of the gyroscope(s). For example, the drive circuitry may provide the gyroscope with a drive signal arranged to drive the gyroscope's resonator. In some embodiments, the drive signal may drive oscillation of a proof mass of the gyroscope in one direction (e.g., the x-axis). When the gyroscope undergoes angular motion about an axis (e.g., the x-axis), the proof mass may move in another direction (e.g., the y-axis). The angular motion may be detected based on this motion (e.g., based on the extent to which the proof mass has moved).

Figure 2B:
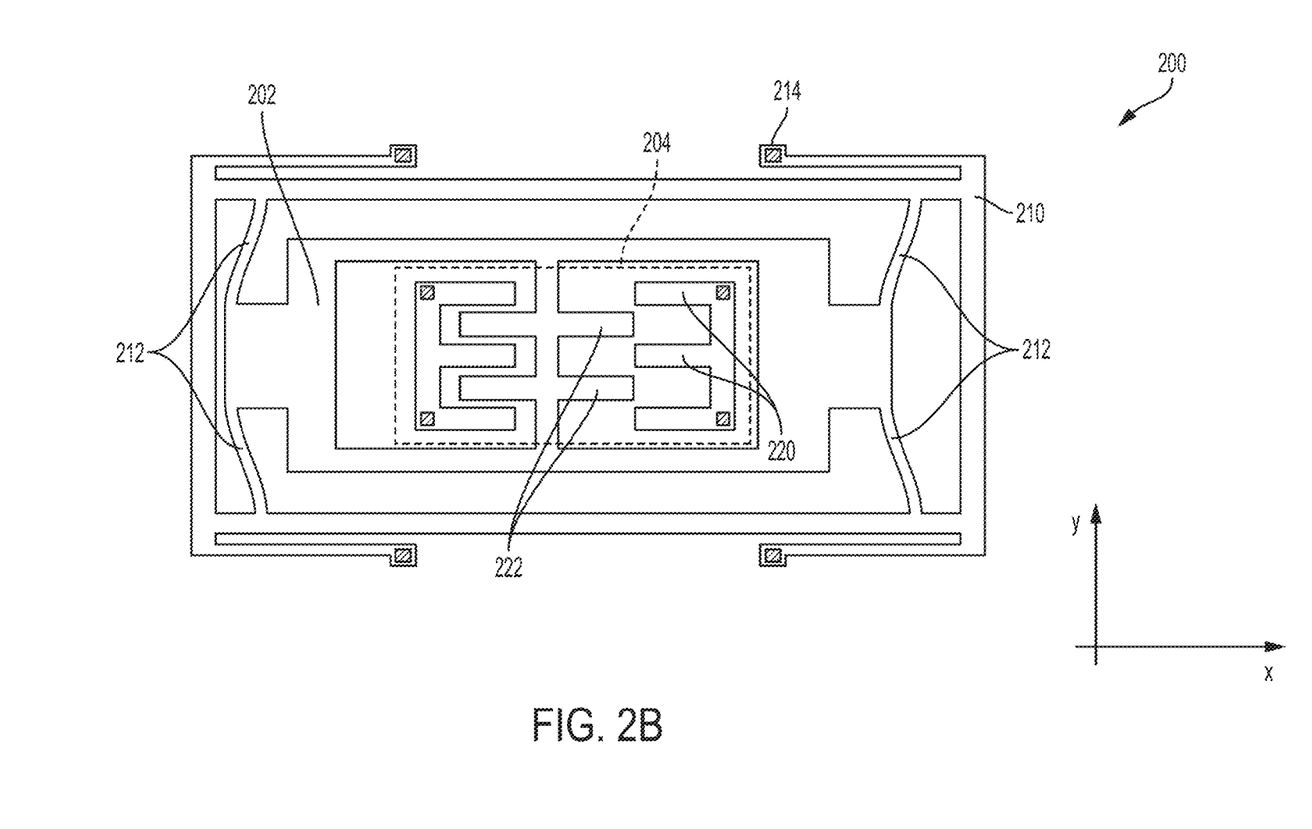
FIG. 2B is a schematic diagram of an illustrative MEMS gyroscope that may be tested using the example system of FIG. 1, in accordance with some embodiments of the technology described herein.

An illustrative gyroscope that may be included in the MEMS inertial sensor 100 is shown in FIG. 2B. In this example, gyroscope 200 is configured to resonate in a direction parallel to the x-axis and to detect Coriolis forces in a direction parallel to the y-axis. It should be appreciated that gyroscopes of the types described herein are not limited to any specific direction of resonance or detection.

In some embodiments, gyroscope 200 includes a stationary frame 210 (anchored to an underlying substrate via anchors 214), proof mass 202, and stationary electrodes 220. Proof mass 202 is elastically coupled to stationary frame 210 via couplers 212. Couplers 212 may be compliant, thus allowing for motion of proof mass 202 relative to stationary frame 210. In this example, proof mass 202 serves as the gyroscope's resonator. Accordingly, when the drive signal (provided by drive circuitry) is applied to one or more electrodes (not shown in FIG. 2B) coupled to proof mass 202, proof mass 202 oscillates in the x-axis direction.

In some embodiments, proof mass 202 includes multiple free-end beams 222, which form a plurality of sense capacitors with respective fixed electrodes 220. The capacitance of the sense capacitors varies depending on the acceleration of the proof mass in the y-axis direction. When gyroscope 200 is subjected to angular motion about the x-axis and proof mass 202 is driven (with drive signals produced by drive circuitry) to oscillate along the x-axis, a Coriolis force along the y-axis arises and the proof mass moves along the y-axis. Angular velocity can be determined by detecting the acceleration of proof mass 202 along the y-axis.

Referring back to FIG. 1, the end-user may receive the signal generated by the MEMS inertial sensor 100 in response to acceleration and/or angular motion. For example, the response signal may be generated in response to capacitance variations of the capacitor formed between electrode 254 and proof mass 250 (FIG. 2A) or the signal generated in response to Coriolis forces experienced by sensor 204 (FIG. 2B). As will be described further below, the output of the MEMS inertial sensor 100 may be filtered using notch filter 121.

In some embodiments, test circuitry 104 may be arranged to test operational characteristics of MEMS inertial sensor 100. For example, test circuitry 104 may be configured to generate test signals to be applied to the MEMS inertial sensor 100, determine how MEMS inertial sensor 100 responds, and determining whether the MEMS inertial sensor 100 is operating properly based on the response. The test signal may mimic the presence of an acceleration and/or angular motion. For example, with reference to the accelerometer of FIG. 2A, the test circuitry 104 may cause the proof mass 250 to move by electrostatic attraction or repulsion using an electrostatic force transducer 101. With reference to FIG. 2B, the test circuitry 104 may apply a test signal so as to cause motion of proof mass 202 along the y-axis, simulating the presence of Coriolis forces.

As shown in FIG. 1, test circuitry 104 includes signal generator 110, adder 111, in-phase signal generator 112, quadrature signal generator 114, mixers 116 and 118, and response analyzer 122. Signal generator 110 is configured to generate the test signal. In some embodiments, signal generator 110 may be configured to output, as the test signal, a periodic waveform such as a periodic square wave or a sinusoidal wave, or a pseudo-random sequence. The fundamental frequency of the periodic waveform is referred to as $f_1$. In some embodiments, $f_1$ may be 500 Hz or 1 KHz, though the application is not limited to any specific frequency. For example, $f_1$ may be between 250 Hz and 2 KHz, between 250 Hz and 1.5 KHz, between 500 HzHz and 1 KHz, between 250 Hz and 750 Hz, or in any range within such ranges The test signal may be converted to a mechanical stimulus via electrostatic force transducer 101, which may be implemented for example by applying a voltage across an accelerometer proof mass 250 and an actuation electrode 254. The output of electrostatic force transducer 101 may be combined with an inertial force (such as acceleration and/or angular motion) to be measured, for example using adder 111. The combined forces may be provided as input to inertial sensor 100.

In some circumstances, the test circuitry 104 may test operation of the MEMS inertial sensor 100 at a time when the MEMS inertial sensor 100 is not subject to any external inertial force. In other circumstances, the test circuitry 104 may test operation of the MEMS inertial sensors 100 at a time when the MEMS inertial sensor 100 is subjected to an inertial force. Either way, the response signal represents the MEMS inertial sensor's response to the received inputs, whether the test signal, the inertial force, noise or other spurious signals, or any combination thereof.

To prevent the detection of the response to the test signals, in some embodiments, the response signals may be filtered with notch filter 121 prior to be provided to the end-user. Notch filter 121 may exhibit a stop-band centered approximately at the fundamental frequency of the test signal. As such, notch filter 121 may include an input for receiving the test signal, and circuitry for setting the frequency of the stop-band based on the fundamental frequency of the test signal.

In some embodiments, mixer 116 receives and mixes (e.g., multiplies) the response signal and an in-phase reference signal. The in-phase reference signal is substantially in-phase with respect to (or correlated with, if the test signal is comprises a pseudo-random sequence) the test signal. For example, the in-phase reference signal may have a phase difference relative to the test signal between $-\pi/30$ and $\pi/30$, between $-\pi/20$ and $\pi/20$, between $-\pi/10$ and $\pi/10$, or in any range within such ranges. In-phase signal generator 112 may be used to cause the in-phase reference signal to be substantially in phase with the test signal. In-phase signal generator 112 may include, for example, a phase-locked loop. In some embodiments, however, the value of $f_1$—may be sufficiently low that the use a simple conductive line instead of the phase locker may be sufficient. In some of these embodiments, the test circuitry 104 may behave as a lumped circuit, such that the signals that travel inside the test circuitry exhibit negligible phase changes. To ensure that test circuitry 104 behaves as a lumped circuit, the value of $f_1$ may be chosen to be below 5 KHz, at least in some embodiments. In other embodiments, however, it may be desirable to operate the test circuitry 104 at higher frequencies to avoid interference with low frequency noise, such 1/f noise. The drawback is that the phase of the signals may change as they travel inside test circuitry 104. In these embodiments, in-phase signal generator 112 may establish the desired phase relationship between the test signal and the in-phase response signal.

In some embodiments, mixer 118 receives and mixes the response signal and a quadrature reference signal. The quadrature reference signal is configured to be substantially in quadrature with respect to (or uncorrelated relative to, if the test signal is a pseudo-random sequence) the test signal. For example, the quadrature reference signal may have a phase difference, in absolute value, relative to the test signal between $\pi/2-\pi/30$ and $\pi/2+\pi/30$, between $\pi/2-\pi/20$ and $\pi/2+\pi/20$, between $\pi/2-\pi/10$ and $\pi/2+\pi/10$, or in any range within such ranges. Quadrature signal generator 114 may be configured to shift the phase of the test signal, for example using a phase shifter, by between $\pi/2-\pi/30$ and $\pi/2+\pi/30$, between $-(\pi/2-\pi/30)$ and $-(\pi/2+\pi/30)$, between $\pi/2-\pi/20$ and $\pi/2+\pi/20$, between $-(\pi/2-\pi/20)$ and $-(\pi/2+\pi/20)$, between $\pi/2-\pi/10$ and $\pi/2+\pi/10$, or between $-(\pi/2-\pi/10)$ and $-(\pi/2+\pi/10)$, among other possible values.

In some embodiments, the signal obtained by mixing the response signal and the in-phase reference signal (referred to as the in-phase response signal) and the signal obtained by mixing the response signal and the quadrature reference signal (referred to as the quadrature response signal) are provided as inputs to the response analyzer 122. Response analyzer 122 determines whether the received signals are to be used as a reliable indication of a characteristic of the MEMS inertial sensor 100. For example, response analyzer 122 may determine whether the response of the MEMS inertial sensor 100 to the test signal is corrupted by the presence of spurious signals or mechanical stimuli (e.g., noise or other types of signals) at frequency $f_1$. If it is determined that the response of the MEMS inertial sensor 100 to the test signal is not corrupted, response analyzer 122 may assess the characteristic(s) of the MEMS inertial sensor 100.

In some embodiments, the quadrature response signal may be used to determine whether the response signal is affected by spurious signals other than the test signal. Being substantially in quadrature with the test signal, the amplitude of the quadrature response signal is negligible when a test signal is applied but no spurious signals are present in the system. Therefore, when the amplitude of the quadrature response signal is significant (e.g., above a certain threshold), it likely that there are spurious signals present in the system. At the same time, being in phase with the test signal, the in-phase response signal directly reflects the response of the MEMS inertial sensor to the test signal. The in-phase response signal may also affected by the presence of spurious signals. Therefore, when is determined, using the quadrature response signal, that system is substantially free of spurious signal, the in-phase response signal may be used as a measure of the characteristic(s) of the MEMS inertial sensor. For example, the in-phase response signal may be used to assess whether the sensitivity of the MEMS inertial sensor 100 to acceleration or angular motion is within an acceptable range, and/or to assess whether the result of the test is to be used or discarded.

Though not illustrated in FIG. 1, test circuitry 104 may include multiple signal generators 110, where the fundamental frequency of the test signal produced by each signal generator is different from that of the others. In this way, the MEMS inertial sensor 100 may be tested with multiple test signals having different frequencies. The benefit is that, even if one test signal were corrupted by the presence of a spurious signal at the same frequency, the likelihood that there are spurious signals in the environment at all of the multiple frequencies of all the test signals is substantially lower. In some of these embodiments, test circuitry 104 may include a mixer 116 and a mixer 118 for each of the test signals produced. The in-phase and quadrature response signals at the various frequencies may be provided to response analyzer 122. Response analyzer 122 may detect, at each received frequency, the presence or absence of spurious signals. The frequenc(ies) at which the response analyzer 122 has determined that there are no significant spurious signals may be used for testing the MEMS inertial sensor using the corresponding in-phase response signals.

Figure 3:
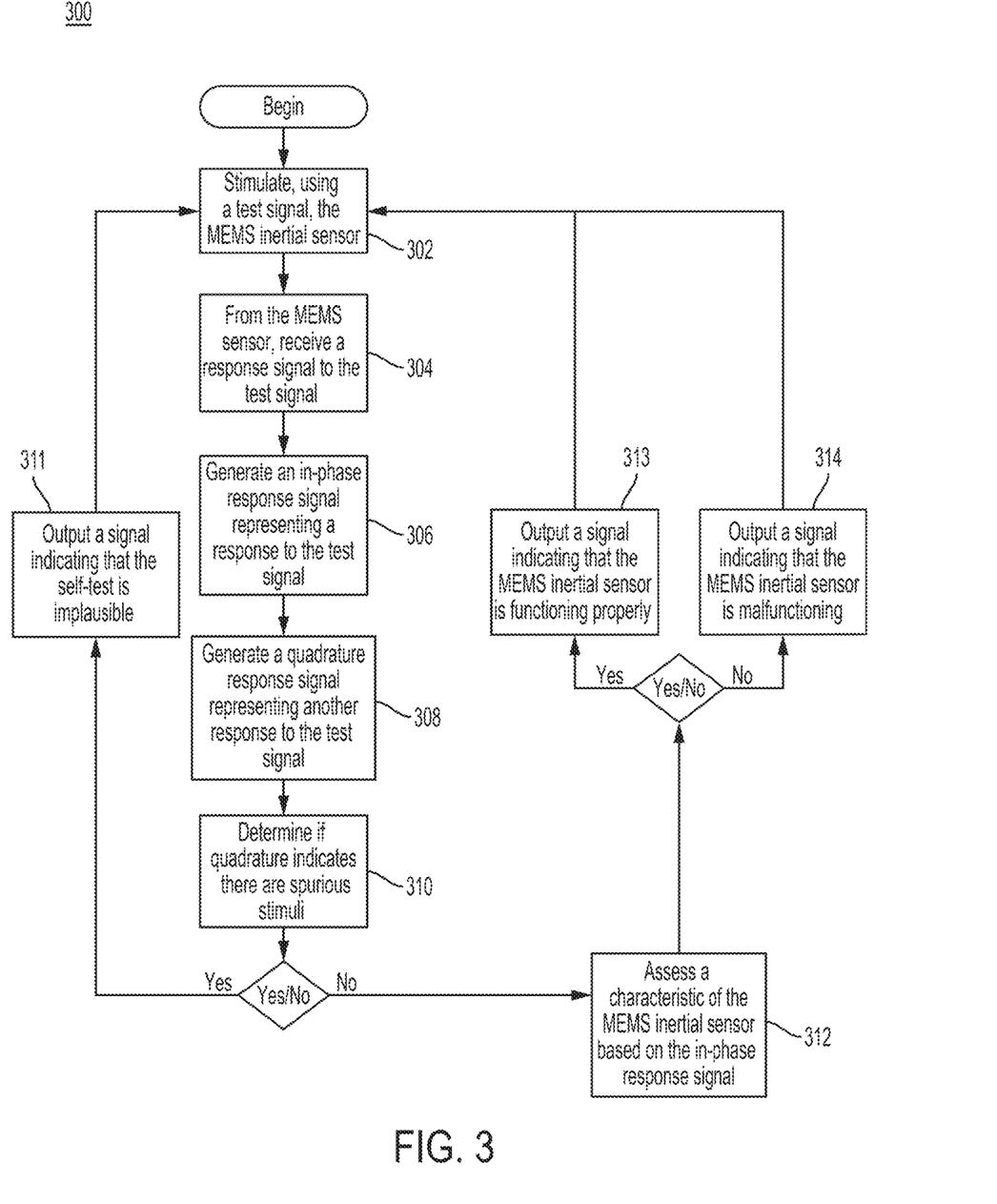
FIG. 3 is a flowchart of an illustrative method for testing a MEMS inertial sensor, in accordance with some embodiments of the technology described herein.

An illustrative process 300 for testing the operation of a MEMS inertial sensor is illustrated in FIG. 3, in accordance with some embodiments of the technology described herein. In some embodiments, process 300 may be performed by illustrative system 100, described in connection with FIG. 1. Process 300 may be performed in the environment in which the MEMS inertial sensor is deployed. For example, process 300 may be performed by a system deployed in a vehicle or in an industrial machine. Process 300 begins at act 302, in which a MEMS inertial sensor is stimulated using a test signal. The test signal may be generated by test circuitry to simulate (e.g., with an acceleration and/or angular rate) the MEMS inertial sensor. In some embodiments, signal generator 110 of FIG. 1 may generate the test signal of act 302.

At act 304, a response signal is received from the MEMS inertial sensor in response to the stimulus. At act 306, an in-phase response signal is generated using the response signal and an in-phase reference signal. For example, the in-phase response signal may be generated by mixing the response signal and the in-phase reference signal. The in-phase reference signal may be substantially in phase with the test signal. In some embodiments, mixer 116 of FIG. 1 may generate the in-phase response signal of act 306.

At act 308, a quadrature response signal is generated using the response signal and a quadrature reference signal. For example, the quadrature response signal may be generated by mixing the response signal and the quadrature reference signal. The quadrature reference signal may be substantially in quadrature with the test signal. In some embodiments, mixer 118 of FIG. 1 may generate the quadrature response signal of act 306.

At act 310, it may be determined whether the response of the MEMS inertial sensor to the stimulus is to be used as a reliable measure of the characteristic(s) of the MEMS inertial sensor. For example, it may be determined, based on the quadrature response signal, whether the in-phase response signal is to be used as a measure for assessing the characteristic(s) of the MEMS inertial sensor. Effectively, act 310 may indicate whether spurious stimuli are present in the self-test system. As will be discussed further below, this determination may be performed, at least in some embodiments, by assessing whether the amplitude of the quadrature response signal is above or below a threshold value. In some embodiments, response analyzer 122 of FIG. 1 may determine whether the in-phase response signal is to be used as a measure for assessing the characteristic(s) of the MEMS inertial sensor.

When it is determined that the in-phase response signal is not to be used as a measure of the characteristic of the MEMS inertial sensor, process 300 may continue to cycle through acts 302-310. The cycle may continue, for example, until it is determined that the in-phase response signal is to be used as a measure of the characteristic(s) of the MEMS inertial sensor. Optionally, at act 311, an output signal indicating that the result of the self-test is implausible is output. The output signal may indicate that the result of the self-test is to be ignored.

When it is determined that the in-phase response signal is to be used as a measure of the characteristic of the MEMS inertial sensor, process 300 proceeds to act 312, in which the characteristic(s) of the MEMS inertial sensor are assessed. Characteristics of the MEMS inertial sensor that may be assessed include but are not limited to the sensitivity of an accelerometer to acceleration in a particular direction or about a particular axis, the sensitivity of a gyroscope to angular velocity about a particular axis, and/or the bandwidth or dynamic range of the MEMS inertial sensor. For example, it may be determined whether the characteristic of the MEMS inertial sensor is greater than a threshold value representing the minimum acceptable value for that characteristic, where the minimum acceptable value may be set by a user, or may be set automatically by the system depending on the context. In other embodiments, the characteristic of the MEMS inertial sensor may be compared to a set of threshold values. Depending on where the value of the characteristic falls relative to the thresholds, the system may notify the user the degree of which the MEMS inertial sensor deviates from the desired behavior.

When it is determined that the characteristic of the MEMS inertial sensor is satisfactory, e.g., is above a threshold value, process 300 may move to act 313, or may complete. At act 313, a signal indicating that the MEMS inertial sensor is functioning properly, at least with respect to the characteristic assessed at act 312, is output. However, when it is determined that the characteristic of the MEMS inertial sensor is not satisfactory, e.g., is below a threshold, process 300 may move to act 314, in which a notification signal indicating that the MEMS inertial sensor is malfunctioning may be output (e.g., may be displayed or otherwise communicated to a user). In some embodiments, process 300 may inform the user how malfunctioning, for example in a scale from 0 to 10 (or any other suitable scale), the MEMS inertial sensor is with respect to that characteristic. This may be performed, for example, by comparing the in-phase response signal to a set of thresholds. Process 300 may then end or perform another cycle.

Process 300 may be performed using any suitable type of test signal. In some embodiments, process 300 may be performed using multiple test signals at different frequencies. In this manner, the reliability of the method may be improved, since the likelihood that all the frequencies are simultaneously disturbed by spurious signals is lower relative to a single frequency scheme.

In some embodiments, response analyzer 122 may determine whether the in-phase response signal is to be used as a reliable measure for assessing the characteristic(s) of the MEMS inertial sensor by comparing the amplitude of the quadrature response signal to a threshold. For example, if the amplitude of the quadrature response signal is less than the threshold, response analyzer 122 may determine that no significantly disturbing spurious signals are present at the frequenc(ies) of the test signal(s). Hence, the in-phase response signal is to be used as a reliable measure for assessing the characteristic(s) of the MEMS inertial sensor. On the other hand, if the amplitude of the quadrature signal is greater than the threshold, response analyzer 122 may determine that spurious signals are disturbing the operations of test circuitry 104, and that the in-phase response signal should not be used to reliably assess the characteristic(s) of the MEMS inertial sensor.

In some embodiments, when it is determined that the in-phase response can be reliably used for assessing the characteristic(s) of the MEMS inertial sensor, this assessment may be performed by comparing the amplitude of the in-phase response signal to a threshold. This threshold may represent the minimum acceptable value for the characteristic of the MEMS inertial sensor being assessed. Therefore, if the amplitude of the in-phase inertial sensor is less than the threshold, response analyzer 122 may determine that the MEMS inertial sensor is malfunctioning, and at least in some embodiments, may notify the user. On the other hand, when the amplitude of the in-phase inertial sensor is greater than the threshold, response analyzer 122 may determine that the MEMS inertial sensor is functioning properly with respect to that characteristic. In some embodiments, the amplitude of the in-phase response signal may be compared with multiple thresholds. The result may indicate the extent to which the MEMS inertial sensor is malfunctioning.

Figure 4:
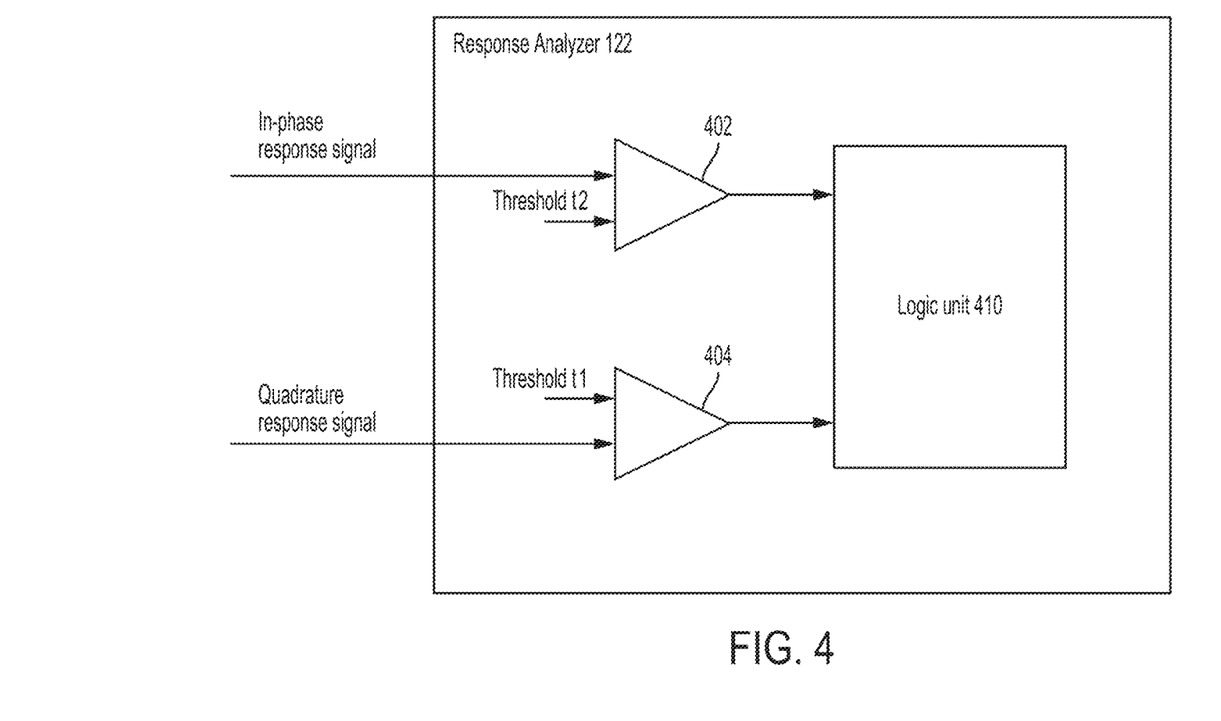
FIG. 4 is a block diagram of an illustrative a response analyzer that may be used in with the example system of FIG. 1, in accordance with some embodiments of the technology described herein.

FIG. 4 illustrates an example implementation of response analyzer 122, in accordance with some embodiments of the technology described herein. In this example, response analyzer 122 includes comparators 402 and 404, and logic unit 410. Comparator 404 receives as inputs the quadrature response signal and threshold t1, and may produce an output based on a comparison between the amplitude of the quadrature response signal and the threshold. The output of comparator 404 may depend, for example, on whether the amplitude of the quadrature response signal is greater or lower than threshold t1. In some embodiments, when the output of the comparator 404 indicates that the amplitude of the quadrature response signal is greater than the threshold t1, the logic unit 410 may determine that the results produced by the test circuitry 104 are corrupted at the frequency of the test signal.

Comparator 402 receives as inputs the in-phase response signal and threshold t2, and may produce an output based on a comparison between the amplitude of the in-phase response signal and the threshold t2. The output of comparator 402 may depend, for example, on whether the amplitude of the in-phase response signal is greater or lower than threshold t2. In some embodiments, when the output of the comparator 402 indicates that the amplitude of the in-phase response signal is less than the threshold t2, the logic unit 410 may determine that MEMS inertial sensor is malfunctioning.

Figure 5:
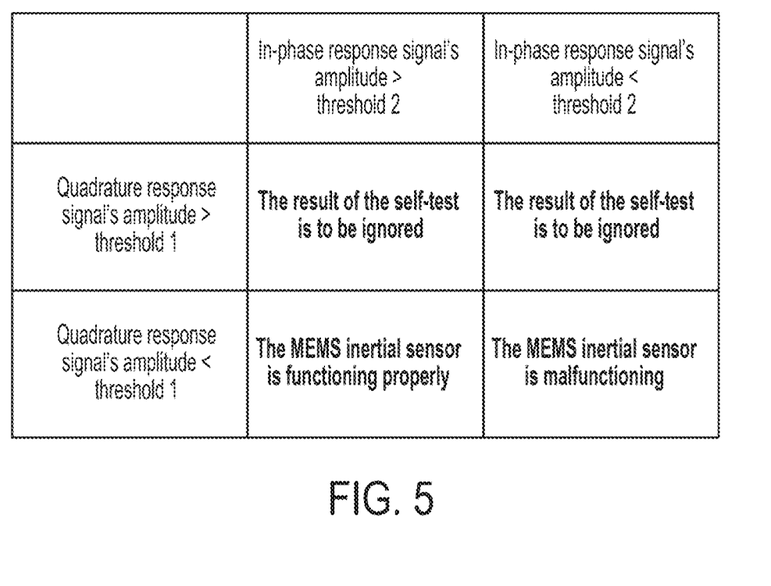
FIG. 5 is a table illustrating how the illustrative response analyzer of FIG. 4 may process the output of a MEMS inertial sensor in response to application of a test signal, in accordance with some embodiments of the technology described herein.

The manner in which logic unit 410 may process the outputs of comparators 402 and 404 is depicted in the table of FIG. 5. As illustrated, logic unit 410 may be programmed to determine that, at the frequency of the corresponding test signal, the test is corrupted by the presence of spurious signals when the amplitude of the quadrature response signal is greater than threshold t1 (regardless of whether the amplitude of the in-phase response signal is greater or less than threshold t2).

Logic unit 410 may be further programmed to determine that, if the amplitude of the quadrature response signal is less than threshold t1 and the amplitude of the in-phase response signal is greater than threshold t2, the MEMS inertial sensor is functioning properly. On the other hand, logic unit 410 may be programmed to determine that, when the amplitude of the quadrature response signal is less than threshold t1 and the amplitude of the in-phase response signal is less than threshold t2, the MEMS inertial sensor is malfunctioning.

Aspects of the technology described herein may provide one or more benefits, some of which have been previously described. Now described are some examples of such benefits. It should be appreciated that not all aspects and embodiments necessarily provide all of the benefits now described. Further, it should be appreciated that aspects of the technology described herein may provide additional benefits to those now described.

Aspects of the technology described herein provide a method self-testing a MEMS inertial sensor. For example, some embodiments are configured to assess whether a MEMS inertial sensor is functioning properly or is malfunctioning, or in some embodiments, the extent to which the MEMS inertial sensor is malfunctioning. Other aspects of the technology described herein provide an indication of whether the result of the self-test is to be ignored, for example, because of the presence of spurious signals, or is to be trusted.

What is claimed is:

1. A system for testing a microelectromechanical system (MEMS) inertial sensor, the system comprising:
   test circuitry configured to:
      receive a response signal representing a response of the MEMS inertial sensor to a test signal generated by a signal generator;
      generate an in-phase response signal by mixing a first reference signal with the response signal, wherein the first reference signal is based on the test signal;
      generate a quadrature response signal by mixing the response signal with a second reference signal that is based on the test signal and is substantially in quadrature relative to the first reference signal;
      determine, based on the quadrature response signal, whether the in-phase response signal is to be used for assessing a characteristic of the MEMS inertial sensor; and
      when it is determined that the in-phase response signal is to be used for assessing the characteristic of the MEMS inertial sensor, assess the characteristic of the MEMS inertial sensor using the in-phase response signal.

2. The system of claim 1, wherein the first reference signal and the test signal are substantially in-phase relative to each other.

3. The system of claim 1, further comprising a phase shifter configured to cause the second reference signal and the test signal to be substantially in quadrature relative to each other.

4. The system of claim 1, wherein the test circuitry comprises a comparator, and wherein the test circuitry is configured to determine whether the in-phase response signal is to be used for assessing the characteristic of the MEMS inertial sensor at least in part by comparing, with the comparator, an amplitude of the quadrature response signal with a threshold amplitude.

5. The system of claim 1, wherein, when it is determined, based on the quadrature response signal, that the in-phase response signal is not to be used for assessing the characteristic of the MEMS inertial sensor, the test circuitry is further configured to output a notification signal indicating that a result of a self-test is to be ignored.

6. The system of claim 1, further comprising the signal generator configured to stimulate, using the test signal, the MEMS inertial sensor.

7. A method for testing a microelectromechanical system (MEMS) inertial sensor, the method comprising:
   stimulating, using a test signal, the MEMS inertial sensor;
   receiving a response signal from the MEMS inertial sensor in response to the stimulating;
   generating an in-phase response signal using the response signal and a first reference signal that is based on the test signal;
   generating a quadrature response signal using the response signal and a second reference signal that is based on the test signal and is substantially in quadrature relative to the first reference signal;
   determining, based on the quadrature response signal, whether the in-phase response signal is to be used for assessing a characteristic of the MEMS inertial sensor; and
   when it is determined that the in-phase response signal is to be used for assessing the characteristic of the MEMS inertial sensor, assessing the characteristic of the MEMS inertial sensor using the in-phase response signal.

8. The method of claim 7, further comprising causing the first reference signal and the test signal to be substantially in-phase relative to each other.

9. The method of claim 7, further comprising causing the second reference signal and the test signal to be substantially in quadrature relative to each other.

10. The method of claim 7, wherein determining, based on the quadrature response signal, whether the in-phase response signal is to be used for assessing the characteristic of the MEMS inertial sensor comprises determining whether an amplitude of the quadrature response signal is below a first threshold amplitude.

11. The method of claim 7, wherein assessing the characteristic of the MEMS inertial sensor using the in-phase response signal comprises determining whether an amplitude of the in-phase response signal is above a second threshold amplitude.

12. The method of claim 11, wherein, if the amplitude of the in-phase response signal is not above the second threshold amplitude, the method further comprises outputting a notification signal indicating that the MEMS inertial sensor is malfunctioning.

13. The method of claim 7, wherein the characteristic of the MEMS inertial sensor comprises a sensitivity of a MEMS accelerometer to acceleration or a sensitivity of a MEMS gyroscope to angular motion.

14. A system for testing a microelectromechanical system (MEMS) inertial sensor, the system comprising:
   the MEMS inertial sensor; and
   test circuitry configured to:
      receive a response signal from the MEMS inertial sensor in response to a test signal;
      generate an in-phase response signal using the response signal and a first reference signal that is based on the test signal, and generating a quadrature response signal using the response signal and a second reference signal that is based on the test signal and is substantially in quadrature relative to the first reference signal;

determining, based on the quadrature response signal, whether the in-phase response signal is to be used for assessing a characteristic of the MEMS inertial sensor; and when it is determined that the in-phase response signal is to be used for assessing the characteristic of the MEMS inertial sensor, assess the characteristic of the MEMS inertial sensor using the in-phase response signal.

15. The system of claim 14, wherein the test circuitry is further configured to cause the first reference signal and the test signal to be substantially in-phase relative to each other.

16. The system of claim 14, wherein the test circuitry is further configured to cause the second reference signal and the test signal to be substantially in quadrature relative to each other.

17. The system of claim 14, wherein the test circuitry is configured to determine, based on the quadrature response signal, whether the in-phase response signal is to be used for assessing the characteristic of the MEMS inertial sensor at least in part by determining whether an amplitude of the quadrature response signal is below a first threshold amplitude.

18. The system of claim 14, wherein the test circuitry is configured to assess the characteristic of the MEMS inertial sensor using the in-phase response signal at least in part by determining whether an amplitude of the in-phase response signal is above a second threshold amplitude.

19. The system of claim 18, wherein test circuitry is further configured, if the test circuitry determines that the amplitude of the in-phase response signal is not above the second threshold amplitude, to output a notification signal indicating that the MEMS inertial sensor is malfunctioning.

20. The system of claim 14, wherein the characteristic of the MEMS inertial sensor comprises a sensitivity of a MEMS accelerometer to acceleration or a sensitivity of a MEMS gyroscope to angular motion.

* * * * *